United States Patent [19]
Henze et al.

[11] 4,167,829
[45] Sep. 18, 1979

[54] LINE GUIDING TIP FOR TROLLING APPARATUS

[75] Inventors: Walter J. Henze, Philadelphia; San Thein, Hatfield, both of Pa.

[73] Assignee: Penn Fishing Tackle Mfg. Co., Philadelphia, Pa.

[21] Appl. No.: 784,685

[22] Filed: Apr. 5, 1977

[51] Int. Cl.² ............................................. A01K 91/02
[52] U.S. Cl. ........................................ 43/27.4; 43/24
[58] Field of Search ................................... 43/24, 27.4

[56] References Cited

U.S. PATENT DOCUMENTS

| | | | |
|---|---|---|---|
| 1,861,819 | 6/1932 | Russell | 43/24 UX |
| 2,164,803 | 7/1939 | Duraffourg | 43/24 |
| 2,893,158 | 7/1959 | Haber | 43/24 |
| 3,117,388 | 1/1964 | Clarke | 43/24 |
| 3,210,881 | 10/1965 | Wilson | 43/24 |
| 3,967,405 | 7/1976 | Henze et al. | 43/27.4 |

*Primary Examiner*—Harold D. Whitehead
*Attorney, Agent, or Firm*—Zachary T. Wobensmith, 2nd; Zachary T. Wobensmith, III

[57] ABSTRACT

A line guiding tip for trolling apparatus used with a boat is shown which line guiding tip is carried by a boom extending from the apparatus and includes a mounting plug rotatably carried by the boom and a sleeve support attached thereto which carries a pulley over which passes line from a reel carried on the apparatus, over the boom through a guide over the pulley and out through a readily removable bushing carried by a bracket also mounted to the sleeve support. The bracket is rotatable in response to changes in direction of the line. Movement of the bracket to a position approximately parallel to the boom is obtained improving access to and reducing damage to the line when the end of the line is pulled aboard the boat.

3 Claims, 8 Drawing Figures

LINE GUIDING TIP FOR TROLLING APPARATUS

BACKGROUND OF THE INVENTION

1. Field of the Invention

This invention relates to a line guiding tip for trolling apparatus of the swivel type for carrying and guiding the line from the trolling apparatus.

2. Description of the Prior Art

The use of trolling apparatus for taking of various species of fish has greatly increased. Such apparatus are particularly useful for delivery of bait to a zone having a water temperature where the fish sought are likely to be feeding.

The trolling apparatus is characteristically mounted on a portion of a boat and is likely to receive rough treatment. In order to change bait, the line must be wound up and the end of the line pulled aboard the boat. The line is often at a perpendicular angle to the direction at which it leaves the apparatus with consequent wear and kinking of the line. It is also necessary to be able to quickly remove the bait, line or connection portions with a minimum of effort and often under less than ideal boating conditions.

An example of trolling apparatus is disclosed in our prior U.S. Pat. No. 3,961,438 wherein the tip is an integral part of the boom of the apparatus and cannot swivel of its own accord. While this apparatus is satisfactory, the line is unguided between the reel and pulley and damage to the line can occur when changing bait, as the tip movement is restricted, causing line kinking, and fast line change is difficult. In our prior U.S. Pat. No. 3,967,405, a trolling apparatus is disclosed wherein the tip can swivel independently of the boom, however, this structure suffers from many of the same problems as the structure shown in U.S. Pat. No. 3,961,438.

SUMMARY OF THE INVENTION

A line guiding tip for a trolling apparatus is provided which is carried by the boom of the trolling apparatus, which apparatus includes a frame detachably mounted to a mounting bracket fastened to the deck or transom of a boat, which frame rotatably carries a large reel. The reel may be driven in one direction by a handle through a controlled variable drag mechanism. The line from the reel passes through a guide carried on the boom over a pulley carried on a sleeve support attached to a mounting plug which is carried by and rotatable with respect to the boom and through a bracket on the sleeve support which bracket includes a removable bushing that acts with a stop carried on the line to prevent line entanglement with the pulley.

The principal object of the invention is to provide a tip for trolling apparatus which can be used for trolling with a separate hook and line or for fishing with its own hook and which reduces line entanglement and damage.

A further object of the invention is to provide a tip for trolling apparatus which provides increased freedom of the line at the free end of the boom.

A further object of the invention is to provide a tip for trolling apparatus utilizing a pulley for the line at the end of the boom with a guide bracket for the line with bracket carries a removable bushing.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

Figure 1:
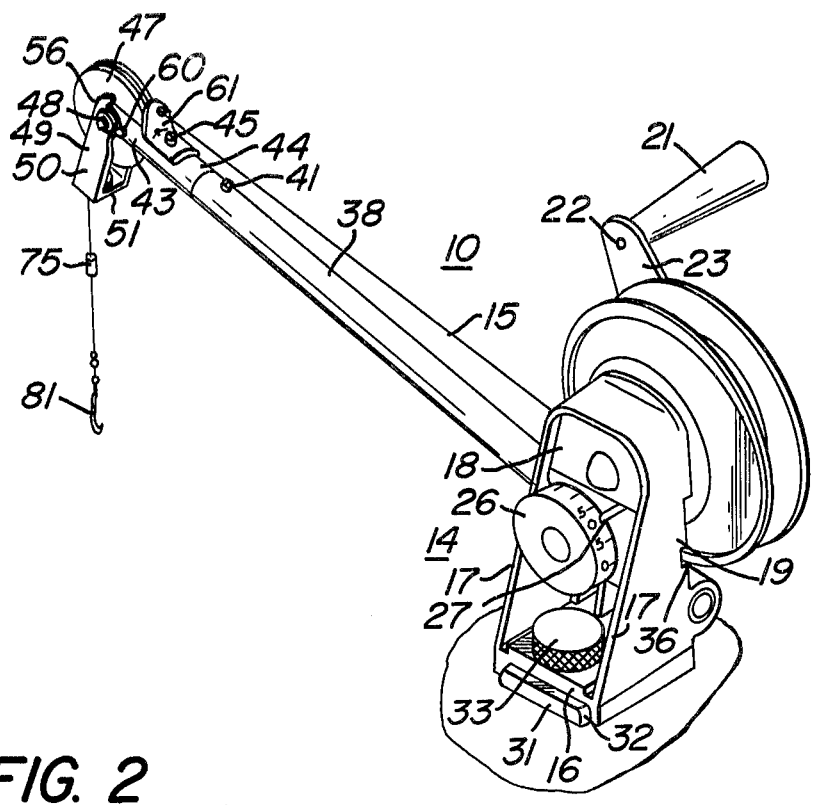
FIG. 1 is a perspective view of a trolling apparatus with the tip therein.
Figure 2:
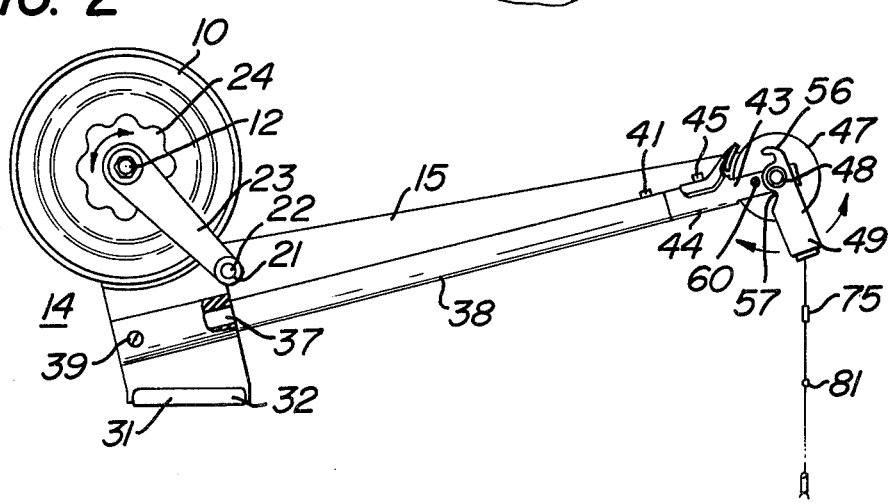
FIG. 2 is a side elevational view of the tip.
Figure 3:
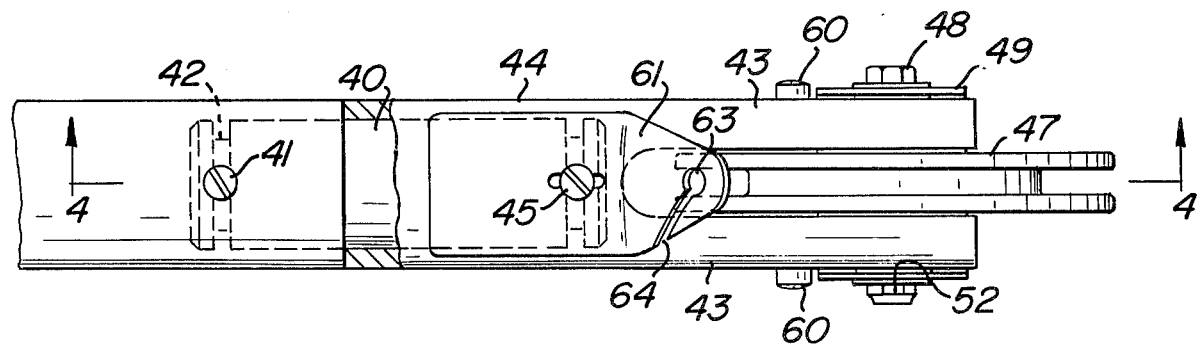
FIG. 3 is an enlarged top plan view of the tip shown in phantom and partial section.
Figure 4:
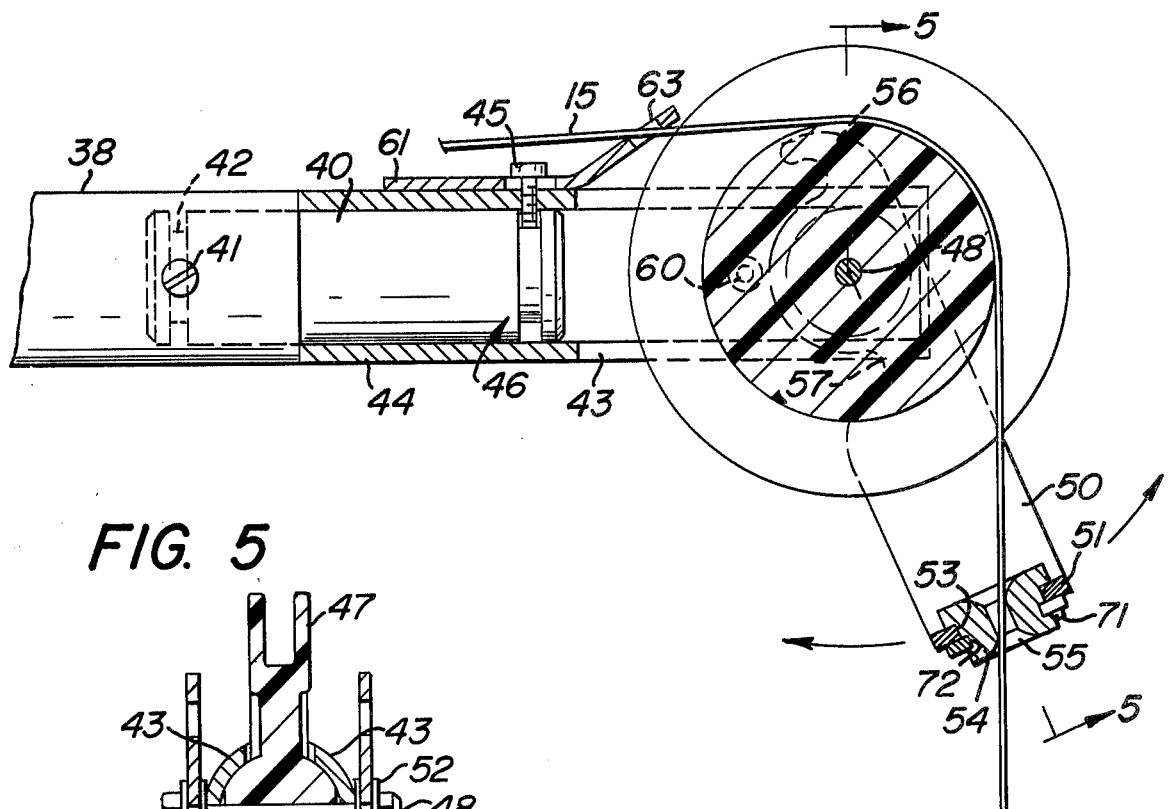
FIG. 4 is a vertical sectional view taken approximately on the line 4—4 of FIG. 3.
Figure 5:
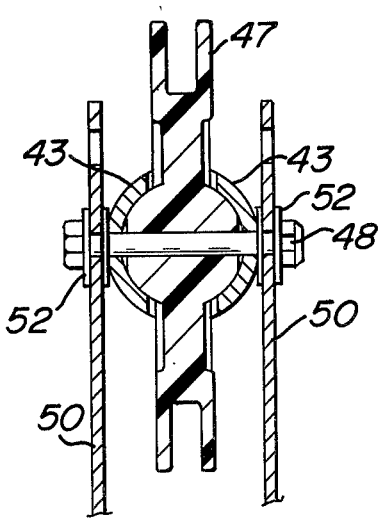
FIG. 5 is a horizontal sectional view taken approximately on the line 5—5 of FIG. 4.
Figure 6:
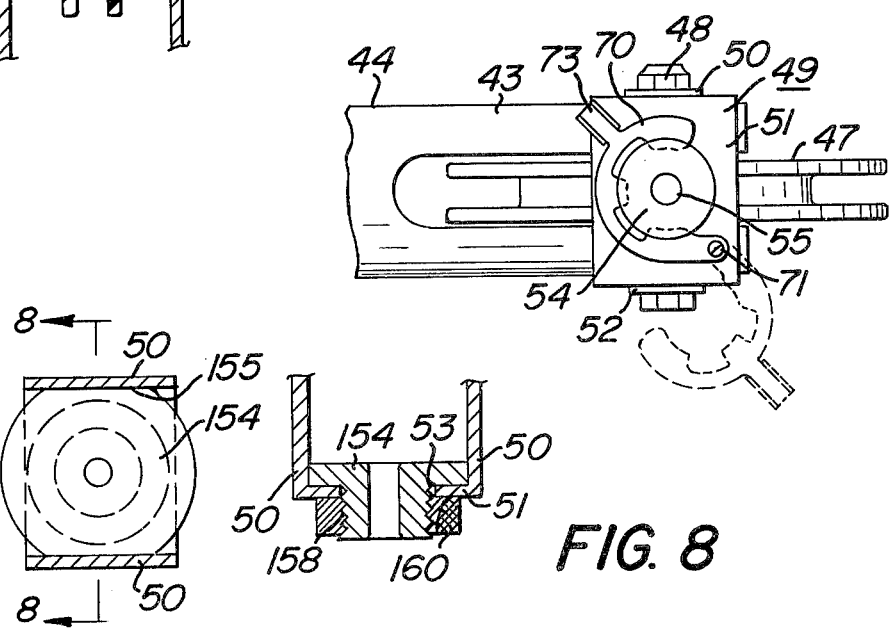
FIG. 6 is a fragmentary view of a portion of the tip.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 6 inclusive, a trolling apparatus is illustrated which includes a reel 10, preferably of moulded synthetic plastic, rotatably carried on a shaft 12, and as more fully shown in U.S. Pat. No. 3,961,438, carried in a frame assembly 14.

The periphery of reel 10 is U-shaped for winding of line 15 onto and from the reel 10. The sides of the U-shaped perimeter of reel 10 slope inwardly and downwardly.

The frame assembly 14 includes a bottom plate 16, side plates 17, and front and rear connecting plate portions 18 and 19. The plates 16, 17, 18 and 19 are preferably integral and moulded in one piece of synthetic plastic.

The reel 10 is rotatable for winding line onto its periphery by a handle 21 rotatably carried on a shaft 22 at the end of an arm 23. The reel 10 may be controlled in any desired manner including an adjustable drag wheel 24 and may have a counter wheel 26 and pointer 27.

A mounting block 31 is provided which may be permanently fastened to the deck or transom of a boat (not shown) in any desired manner. The block 31 is rectangular in shape and may be provided with beveled side edges 32 for engagement with complemental surfaces on the bottom plate 16. A bolt 33 engages a nut (not shown) in the block 31 and detachably retains the frame assembly 14 in place but permits of quick removal when desired.

The frame assembly 14 has an integral cylindrical sleeve 36 thereon which receives the lower end portion 37, of reduced diameter, of a hollow boom 38. The boom 38 is preferably formed of hollow aluminum tubing treated for corrosion resistance and can be detachably held in place in the frame assembly 14 by a screw 39.

The free end of the boom 38 has a mounting plug member 40 therein which can be of nylon and rotatably retained by a stud 41, the end of which extends into a groove 42 in the plug 40.

A sleeve support 44, abutting the end of the boom 38 is provided retained on the mounting plug 40 by a stud 45 extending into a groove 46 in the plug 40, the sleeve 44 being freely rotatable with respect to plug 40 and the boom 38. The sleeve 44 has spaced legs 43 extending therefrom between which a pulley 47 is carried, rotatably mounted on a bolt 48, which is engaged with the legs 43. The bolt 48 also supports a U-shaped bracket 49 which has side plates 50 and a connecting plate 51, and is retained thereto by nut 52.

The plate 51 is provided with a hole 53 which carries a bushing 54, preferably of stainless steel, which is provided with a multi-tapered hole 55 for passage of line 15 from the reel 10.

The plates 50 have hook like projections 56 extending therefrom and notches 57 in the plates 50 spaced approximately 180° from the projections 56 which engage screws 60 in the legs 43, the screws 60 serving as stops to restrict the movement of the bracket 49. It should be noted that the notches 57 in the plates 50 permit the bracket 49 to be swung up along boom 38 such that line 15 from bushing 54 is substantially parallel to boom 38 with the result that kinking of the line does not occur and it is easier to service the bait (not shown) on the end of the line 15.

The line 15, inwardly of the pulley 47, is retained in a guide bracket 61 which is attached to sleeve support 44 by the stud 45. The guide bracket 61 has a central opening 63 to receive and guide the line 15 and an open slot 64 which permits of the line 15 being inserted within or removed from the guide bracket 61 as desired, but which retains the line on pulley 47 when it is swiveled during operation.

The bushing 54, is detachable and retained in the plate 51 by a clip 70 which is secured to plate 51 by a screw 71 and rotatable thereabout into and out of holding engagement with a groove 72 in the bushing 54. The clip 70 is of generally C-shaped configuration and provided with a tang 73 for engagement by fingers of the user (not shown) for rotation of the clip 70.

Figures 7, 8:
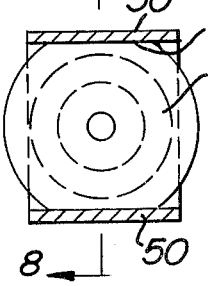
FIG. 7 is a view of another embodiment of a portion of the tip.
FIG. 8 is a vertical sectional view taken approximately on the line 8—8 of FIG. 7.

Referring now more particularly to FIGS. 7 and 8, another embodiment of detachable bushing 154 is therein illustrated which is engaged in the plate 51 of bracket 49. The bushing 154 is generally circular as shown in FIG. 7, with flats 155 thereon which fit between the plates 50 restraining the bushing 154 from rotation. The bushing 154 has a threaded projection 158 thereon which extends through the hole 53 in plate 51 and a knurled nut 160 which is detachably engaged on the threaded projection 158 to permit removal of bushing 154 as desired.

The line 15 can have a stop 75 thereon of cylindrical shape which, when the line 15 is wound onto the reel 10, prevents the line and its attachments 81 from moving past the bushing 54 or 154 and jamming onto the pulley 10.

The mode of operation will now be pointed out.

Assuming that a supply of line 15 is wound onto the reel 10 and suitable attachments 81 are provided on the end of the line 15 and that trolling is desired, a weight (not shown) is fastened to the attachments 81 and a fishing line (not shown) with hook (not shown) and quick release mechanism (not shown) is connected to attachments 81 in a well known manner. The depth to which it is desired to troll is determined and the drag wheel 24 is rotated to release the reel 10 so that it freely rotates and line 15 is paid out to the desired depth.

When a fish strikes or when it is desired to raise the line 15, then the handle 20 may be rotated and line 15 wound onto the reel 10.

The attachments 81 may then be easily moved into the boat (not shown) without kinking of line 15 which does not assume a large angle with respect to boom 39 and the necessary bait (not shown) added to the line or the fish (not shown) removed from the line 15. If it is desired to remove the attachments 81 from the bracket 49, the clip 70 is rotated to move it out of the groove 72 in the bushing 54 and the line 15 detached from the guide bracket 61 through the slot 64 with the bushing 54 remaining on the line 15. A new line 15 can be placed on the reel 10 and fishing proceed as desired. If the bushing 154 is used, then the knurled nut 160 is removed and bushing 154 and line 15 removed as described above.

It will thus be seen that apparatus has been provided with which the objects of the invention are attained.

We claim:

1. Trolling apparatus for fishing including a base, a reel for carrying a supply of line rotatably mounted on said base, a boom secured at one end to said base and having a hollow tubular free end, a plug inserted in said hollow tubular free end and detachably retained therein, a sleeve support on said plug detachably retained thereon and rotatable with respect to said plug and said boom, and a pulley for said line rotatably mounted to said sleeve support by a shaft, the improvement which comprises a first line guiding bracket fixedly mounted on said sleeve support in closely spaced relation to said pulley and having a central opening for guiding the line from said reel onto said pulley, said bracket having a diagonal slot extending from said central opening for insertion and removal of the line, a second line guiding bracket pivotally mounted on said shaft, a bushing detachably carried by said second bracket for guiding said line from said pulley and for permitting removal of the line from said second line guiding bracket, said bushing being of cylindrical shape, and means to retain said bushing in said second line guiding bracket comprising a pivot clip having means projecting into said bushing, and at least one movement limiting member carried by said sleeve support permitting limited rotatable swing movement of said second line guiding bracket to a position substantially parallel to said boom.

2. Trolling apparatus as defined in claim 1 in which said bushing is of cylindrical shape with a threaded projection extending through a portion of said second line guiding bracket and having a nut thereon for retention of said bushing.

3. Trolling apparatus as defined in claim 2 in which said bushing has side portions engaging said second line guiding bracket and retaining said bushing against rotation with respect to said line guiding bracket.

* * * * *